(12) United States Patent
Yeh et al.

(10) Patent No.: US 7,989,716 B2
(45) Date of Patent: Aug. 2, 2011

(54) KEYPAD ASSEMBLY AND ELECTRONIC DEVICE USING SAME

(75) Inventors: Wang-Hung Yeh, Taoyuan (TW); Chung-Yu Liu, Taoyuan (TW)

(73) Assignee: Foxconn Communication Technology Corp., Taoyuan County (TW)

( * ) Notice: Subject to any disclaimer, the term of this patent is extended or adjusted under 35 U.S.C. 154(b) by 19 days.

(21) Appl. No.: 12/610,494

(22) Filed: Nov. 2, 2009

(65) Prior Publication Data

US 2010/0307904 A1    Dec. 9, 2010

(30) Foreign Application Priority Data

Jun. 5, 2009 (CN) .......................... 2009 1 0302989

(51) Int. Cl.
*H01H 9/26* (2006.01)

(52) U.S. Cl. ...................................................... 200/5 A

(58) Field of Classification Search .................. 200/5 A, 200/512, 292, 5 E, 325
See application file for complete search history.

(56) References Cited

U.S. PATENT DOCUMENTS

| | | | | |
|---|---|---|---|---|
| 3,909,564 | A | * 9/1975 | Scheingold et al. | .......... 200/5 E |
| 4,271,333 | A | * 6/1981 | Adams et al. | ................. 379/368 |
| 4,467,150 | A | * 8/1984 | Leitermann et al. | .......... 200/5 A |
| 2005/0274595 | A1 | * 12/2005 | Pihlaja | .......................... 200/512 |

* cited by examiner

*Primary Examiner* — Edwin A. Leon
(74) *Attorney, Agent, or Firm* — Steven M. Reiss

(57) ABSTRACT

A keypad assembly is used for an electronic device. The keypad assembly includes a support member, and a plurality of key strips. The support member defines a plurality of openings and a plurality of cantilever plates, each cantilever plate extending into a corresponding opening. The key strips are received in the openings. Each key strip defines a slot, and each cantilever plate is received in a slot. The cantilever plates provide force to extend one portion of the key strips from the receiving groove.

9 Claims, 5 Drawing Sheets

KEYPAD ASSEMBLY AND ELECTRONIC DEVICE USING SAME

CROSS-REFERENCE TO RELATED APPLICATIONS

This application is related to two co-pending U.S. patent application Ser. Nos. 12/610,491 and 12/610,497, both entitled "KEYPAD ASSEMBLY AND ELECTRONIC DEVICE USING SAME", by CHUNG-YU LIU et al. Such applications have the same assignee as the instant application and have been concurrently filed herewith. The disclosure of the above identified applications is incorporated herein by reference.

BACKGROUND

1. Technical Field

The present disclosure relates to keypad assemblies and, particularly, to a keypad assembly used in an electronic device.

2. Description of Related Art

With the development of wireless communication and information processing technologies, portable electronic devices, such as mobile telephones and personal digital assistants, are now widely used. These electronic devices typically have a keypad assembly as an input terminal.

Keypad assemblies used in portable electronic devices are becoming smaller and thinner. A conventional keypad assembly includes a plurality of keys. The keys are positioned coplanar with each other, and are arranged very close together. Accidental keystrokes are common and easily made. Additionally, use of the keypad may be uncomfortable.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present keypad assembly. Moreover, in the drawings, like reference numerals designate corresponding parts throughout the several views, in which.

DETAILED DESCRIPTION

Figure 1:
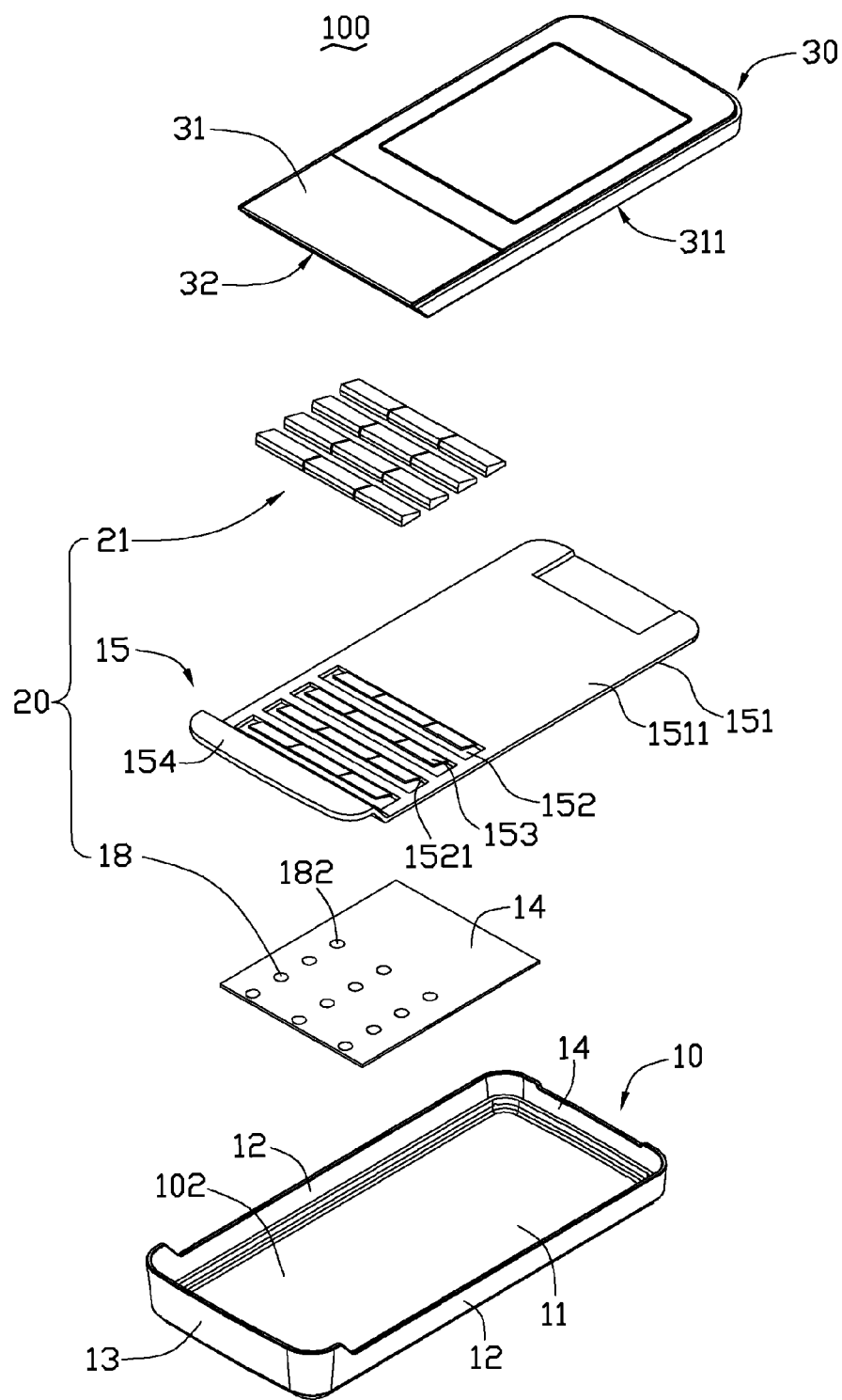
FIG. 1 is an exploded, isometric view of an exemplary keypad assembly used in an electronic device.

FIG. 1 is an exploded, isometric view of an exemplary keypad assembly 20 used in an electronic device 100, such as a slidable mobile phone.

The electronic device 100 includes a housing body 10 and a cover member 30. The housing body 10 includes a bottom portion 11, two sidewalls 12, a first end wall 13 and a second end wall 14, thereby cooperatively defining a cavity 102. The first end wall 13 is higher than the second end wall 14. The cover member 30 is slidably attached to the housing body 10 by a slide mechanism (not shown). The cover member 30 includes a panel 31 and an end portion 32. The panel 31 includes a bottom surface 311 opposite to the housing body 10.

The keypad assembly 20 includes a support member 15, a printed circuited board 18 and four key strips 21.

Figure 2:
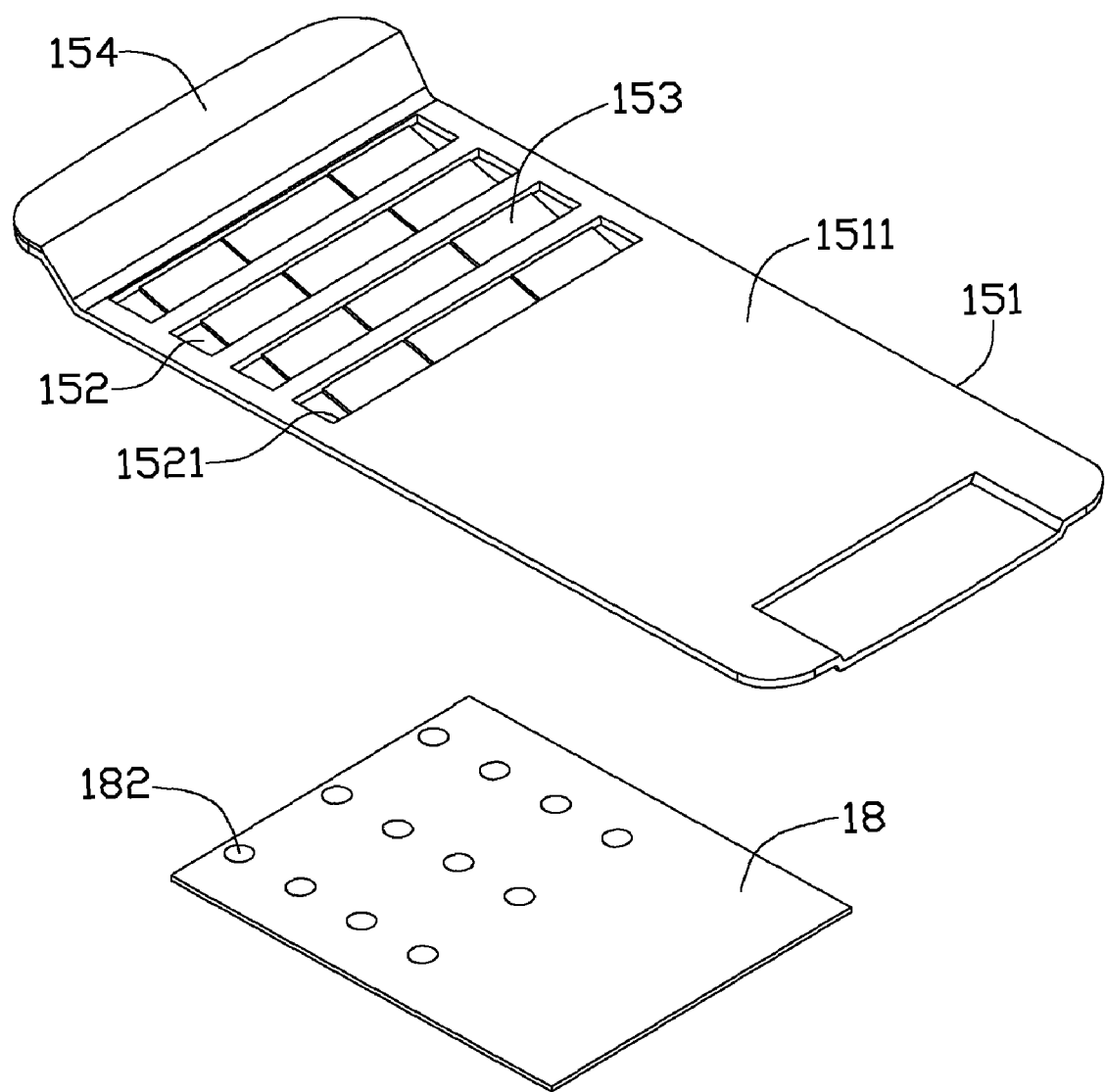
FIG. 2 is an enlarged view of the keypad assembly shown in FIG. 1.

The support member 15 corresponds in size to the housing body 10 and may be supported by the sidewalls 12 and the end walls 13, 14 of the housing body 10 and cover the cavity 102. The support member 15 includes a main body 151 and an extending portion 154 formed at one end thereof. The main body 151 includes an upper surface 1511 and defines four openings 152 adjacent to the extending portion 154. The openings 152 are parallel. The extending portion 154 first extends at an angle, and then parallel to the main body 10. The angled portion of the extending portion 154 subtends an obtuse angle with the main body 151. Referring to FIG. 2, each opening 152 includes a sidewall 1521. A cantilever plate 153 extends in each opening 152 from the sidewall 1521. In this exemplary embodiment, the cantilever plates 153 are angled relative to the upper surface 1511, and may flex up and down in a corresponding opening 152. However, other configurations, such as the cantilever plates 153 being disposed parallel to the upper surface 1511, for example, may also be used depending upon the required key strips 21. The cantilever plate 153 may be formed by punching, injection molding, ultrasonic welding, or other means. Each cantilever plate 153 is divided into three parts to respectively correspond to the key strips 21. The divided parts of each cantilever plate 153 are hinged to each other. When each divided part is operated, the adjacent part of each cantilever plate 153 may be no influence.

The printed circuit board 18 is received in the cavity 102, and positioned in the bottom portion 11. A plurality of contacts 182 are formed in the printed circuit board 18.

Figure 4:
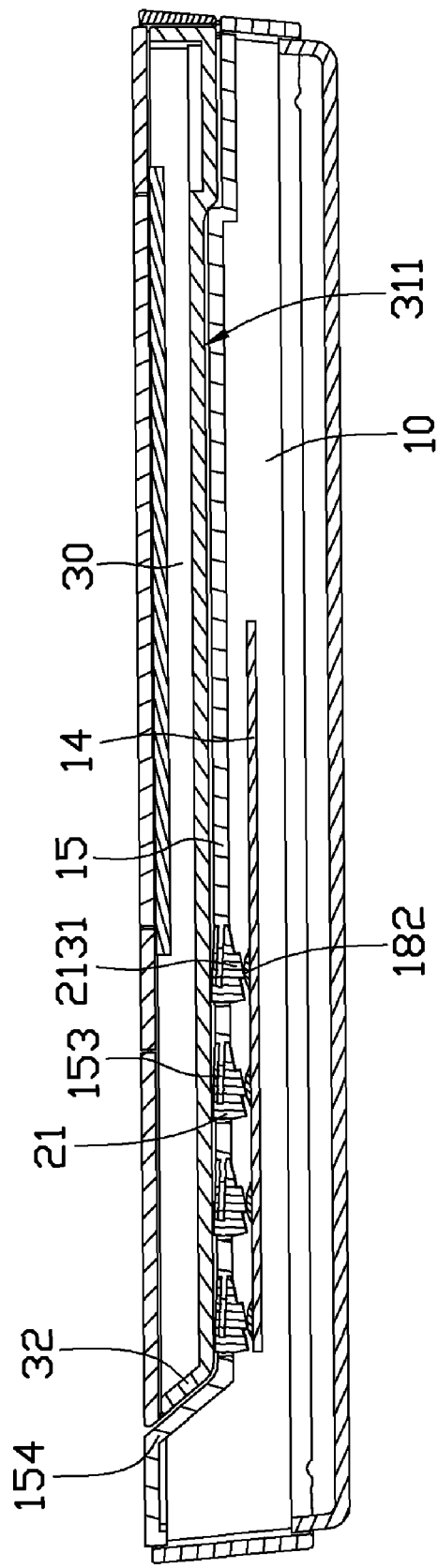
FIG. 4 is a cross section of the keypad assembly shown in FIG. 3 taken along line IV-IV.

Each key strip 21 is engagable in one of the openings 152. Each key strip 21 is substantially wedge-shaped, and allows one portion to protrude from its corresponding opening 152. Each key strip 21 includes a first side surface 211, a second side surface 212, a back surface 213, and a pressing surface 214. The first side surface 211 defines a slot 215. The cantilever plate 153 may be received in the slot 215. Referring to FIG. 4, each back surface 213 forms a projection 2131 for electrical connection to a corresponding contact 182 of the printed circuited board 18. Each key strip 21 may be divided into three or four keys corresponding to e.g. different groups of numbers or words.

Figure 3:
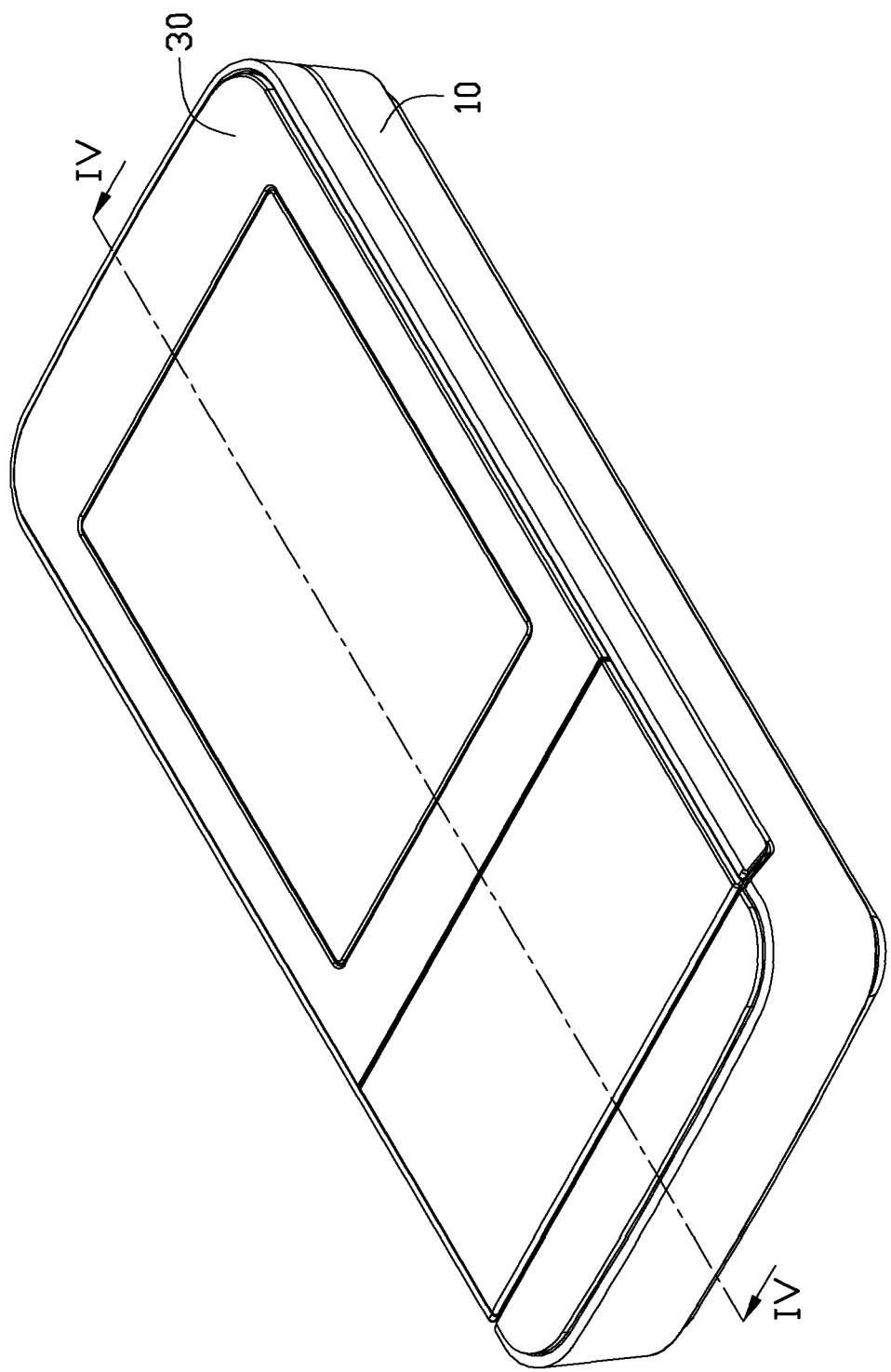
FIG. 3 is an assembled, isometric view of an exemplary electronic device utilizing the keypad assembly of FIG. 1.

In FIGS. 3 and 4, when the keypad assembly 20 is secured to the housing body 10, the printed circuited board 18 is positioned into the cavity 102 of the housing body 10. Each key strip 21 is assembled into a corresponding opening 152 of the support plate 15, and the cantilever plates 152 are received in a corresponding slot 215 of each key strip 21. Since the cantilever plates 153 are angled relative to the main body 151, the key strips 21 are also angled in the openings 152, and one end of each key strip 21 protrudes from its corresponding opening 152.

The support plate 15 with the key strips 21 is secured to the housing body 10. The extending portion 153 abuts the first end wall 13 of the housing body 10. The cover member 30 is slidably attached to the housing body 10, and the bottom surface 311 contacts the portions of the key strips 21 extending out from their corresponding opening 152. As the cover member 30 is slid towards the closed position, the end portion 32 of the cover member 30 forces key strips 21 downward toward the printed circuited board 18 to deform the cantilever plates 153 until the key strips 21 are completely received in their corresponding openings 152. The cover member 30 is closed relative to the housing body 10.

Figure 5:
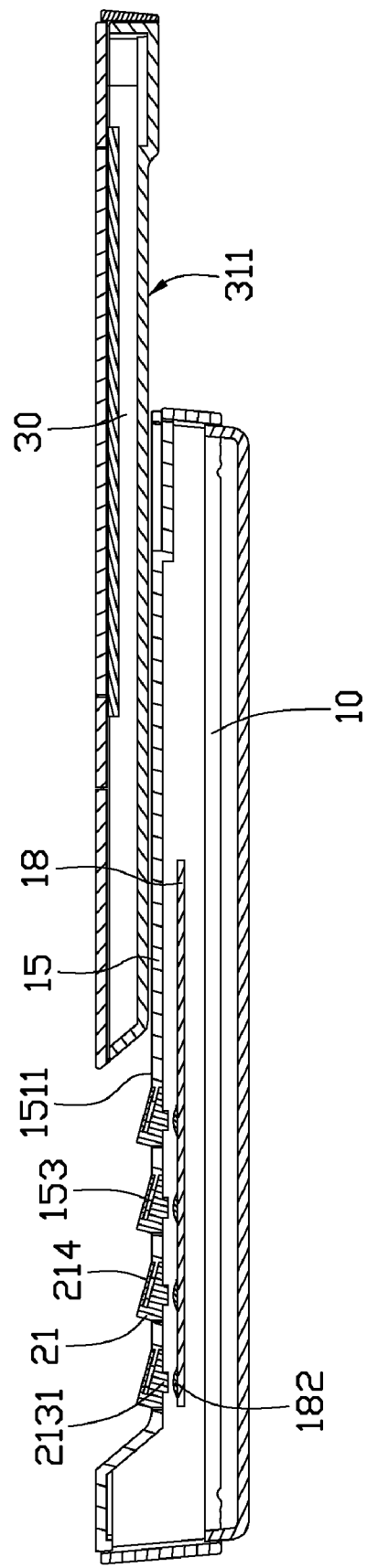
FIG. 5 is similar to FIG. 4, but in an open position.

Referring to FIG. 5, when the cover member 30 is slid toward the open position, the cover member 30 moves relative to the housing body 10 to expose the keypad assembly 20. The cantilever plates 153 resume a relaxed state by elastic force to cause a portion of each of the key strips 21 to protrude from its respective opening 152. Thus, the key strips 21 are accurately, easily and comfortably operated with no increase in size or weight of the electronic device.

It is understood that the key strip may adopt varying shapes such as rectangular, and only requires the cantilever plates are angled relative to the housing.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressing.

What is claimed is:

1. A keypad assembly for an electronic device, the keypad assembly comprising:
    a support member defining a plurality of openings and a plurality of cantilever plates, the cantilever plates integrally formed with the support member, each cantilever plate extending into a corresponding opening; and
    a plurality of key strips, each key strip received in one of the openings, each key strip defining a slot and forming a first clamping portion and a second clamping portion opposite to each other, each cantilever plate being received in one of the slots and sandwiched between the first clamping portion and the second clamping portion; each cantilever plate providing a force extending a portion of the key strips out of its corresponding openings.

2. The keypad assembly as claimed in claim 1, wherein each key strip has a projection formed on a bottom thereof, the projection is under the cantilever plate for electrical connecting to a printed circuited board.

3. The keypad assembly as claimed in claim 1, wherein each opening includes a sidewall, each cantilever plate extends from the sidewall and is angled relative to the support member.

4. The keypad assembly as claimed in claim 3, wherein each cantilever plate is divided into a plurality of parts, the divided parts of each cantilever plate are hinged to each other.

5. The keypad assembly as claimed in claim 1, further comprising a printed circuited board, wherein each key strip is divided into a plurality of keys, each key forming a projection under the cantilever plate connecting electrically to the printed circuited board.

6. An electronic device, comprising:
    a housing body defining a plurality of openings and forming a plurality of cantilever plates;
    a plurality of key strips, each key strip received in one of the openings, each key strip defining a slot and forming a first clamping portion and a second clamping portion opposite to each other, each cantilever plate being received in one of the slots and sandwiched between the first clamping portion and the second clamping portion;
    a cover member slidably attached to the housing body, wherein when the cover member is moved in the opening direction, the cantilever plates provide a forces to extend a portion of the key strips out of the openings.

7. The electronic device as claimed in claim 6, further comprising a printed circuited board, wherein each key strip is divided into a plurality of keys, each key forming a projection formed on a bottom thereof, the projection is under the cantilever plate for electrically connecting to the printed circuited board.

8. The electronic device as claimed in claim 6, wherein each opening includes a sidewall, each cantilever plate extends from the sidewall and is angled relative to the support member.

9. The electronic device as claimed in claim 8, wherein each cantilever plate is divided into a plurality of parts, the divided parts of each cantilever plate are hinged to each other.

* * * * *